United States Patent

Schanzenbach et al.

(10) Patent No.: US 7,508,153 B2
(45) Date of Patent: Mar. 24, 2009

(54) METHOD AND DEVICE FOR DETERMINING THE ROTARY SPEED OF AN ELECTRICAL MACHINE

(75) Inventors: Matthias Schanzenbach, Eberstadt (DE); Juergen Hachtel, Moeckmuehl (DE)

(73) Assignee: Robert Bosch GmbH, Stuttgart (DE)

( * ) Notice: Subject to any disclaimer, the term of this patent is extended or adjusted under 35 U.S.C. 154(b) by 143 days.

(21) Appl. No.: 11/634,445

(22) Filed: Dec. 5, 2006

(65) Prior Publication Data

US 2007/0140669 A1 Jun. 21, 2007

(30) Foreign Application Priority Data

Dec. 14, 2005 (DE) .................... 10 2005 059 585

(51) Int. Cl.
*G05B 11/28* (2006.01)
(52) U.S. Cl. .................... 318/599; 318/811; 388/928.1
(58) Field of Classification Search ............... 318/811, 318/599, 459, 500, 461; 388/800, 819, 815, 388/821, 928.1
See application file for complete search history.

(56) References Cited

U.S. PATENT DOCUMENTS

| 6,034,493 A * | 3/2000 | Boyd et al. ............. 318/400.31 |
| 6,323,609 B1 * | 11/2001 | Lopez .................... 318/400.01 |
| 6,476,996 B1 * | 11/2002 | Ryan ............................ 360/75 |

FOREIGN PATENT DOCUMENTS

DE    199 14 404    10/2000

* cited by examiner

*Primary Examiner*—Rina I Duda
(74) *Attorney, Agent, or Firm*—Kenyon & Kenyon LLP

(57) ABSTRACT

A method for determining the rotary speed of an electrical machine, especially of a direct current motor, which is controlled in PWM operation, the tracking voltage of the electrical machine being measured and the rotary speed being ascertained from that. The rotary speed fluctuations are able to be substantially reduced if the electrical machine is controlled using a control signal which has a PWM phase, in which the electrical machine is periodically switched on and off using a prespecified pulse duty factor, and which has a measuring phase in which the electrical machine is switched off. The rotary speed is measured in the measuring phases, in this instance, and is calculated in the PWM phases based on a model.

19 Claims, 2 Drawing Sheets

METHOD AND DEVICE FOR DETERMINING THE ROTARY SPEED OF AN ELECTRICAL MACHINE

BACKGROUND INFORMATION

Direct current motors, such as the ones used as pump drives for hydraulic pumps in motor vehicle braking systems, are frequently controlled in a PWM operation (PWM: pulse width modulation), in which the direct current motor is periodically switched on and off, using a prespecified pulse control factor. By the suitable selection of the pulse duty factor, the rotary speed of the motor is able to be set and regulated as desired. The pulse duty factor (defined by the "on" time/period duration) in this context determines the rotary speed of the direct current motor, and may basically be selected between 0% (completely switched off) and 100% (durably switched on).

FIG. 1 shows a typical system for rotary speed regulation of a direct current motor 1. The system includes direct current motor 1 that is to be regulated, an electronic system 2, connected to it, having a switching output stage and a control unit 3 connected to electronic system 2. The terminal voltage present at direct current motor 1 is designated by $U_k$, and the current flowing through the motor is designated by $I_{mot}$.

Control unit 3 includes a control algorithm 7, which generates a PWM signal 6 as a function of the system deviation (see FIG. 2), using which the switching output stage of electronic system 2 is periodically switched on and off. Controller 7 usually operates at a clock-pulse rate that is higher than the clock-pulse rate of PWM signal 6.

FIG. 2 shows a typical PWM signal 6 for controlling a direct current motor 1. During power up phases 4, the switch of the switching output stage is closed, and during turnoff phase 5 it is open. Thereby, corresponding to the pulse duty factor, direct current motor 1 is periodically connected to supply voltage $U_{batt}$ or disconnected from it. The duration of the individual phases is denoted by $t_{on}$ and $t_{off}$ in this context. The pulse duty factor is given by: $V=t_{on}/T$.

The current actual rotary speed ω of motor 1, which flows into control algorithm 7 as an input variable, is usually calculated from the so-called tracking voltage. In this context, the tracking voltage is a regenerative terminal voltage $U_k$ of direct current motor 1, which is measured in a switch-on phase 5 of the PWM signal. For rotary speed ω, ω=f($U_k$) applies. The determination of the rotary speed from the tracking voltage of a pump motor is known, for example, from German Patent Application No. DE 199 14 404.

The instantaneous rotary speed ω can only be measured during turnoff phases 5 (indirectly), in which motor 1 generates a regenerative voltage $U_k$. During power up phase 4, on the other hand, no rotary speed measurement is possible. Since control algorithm 7, as a rule, operates at a higher clock-pulse rate and also requires rotary speed values during power up phases 4, the rotary speed is estimated in these phases 4. In order to do this, an average rotary speed is calculated, for instance, in turn off phase 5, and this rotary speed is assumed to be valid also in power up phase 4. However, known estimation methods are relatively inaccurate, since motor 1 is greatly accelerated during power up phase 4, and is braked by the load and mechanical friction during turnoff phases 5. The accuracy of the rotary speed regulation is considerably impaired thereby.

An additional problem of usual PWM operation comes about from the relatively low frequencies of the PWM signals used, of, for instance, 50 Hz. Because of the long power up and turnoff phases 4, 5, rotary speed ω of electric motor 1 fluctuates relatively greatly about the setpoint value. Particularly in the case of small pulse duty factors such as 20%, the rotary speed fluctuations are very strong because of the short power up phases 4 and the relatively long turnoff phases 5. This, in turn, has negative effects upon assemblies that are driven by direct current motor 1.

SUMMARY OF THE INVENTION

It is therefore an object of the present invention to improve the accuracy of the rotary speed regulation of a direct current motor, and simultaneously reduce the rotary speed fluctuations in the process.

An important aspect of the present invention is to control the electrical machine using a control signal that alternatingly has a PWM phase and a measuring phase, instead of using a continuous PWM signal. In the PWM phase, the electrical machine is periodically switched on and off using a prespecified pulse duty factor, and in the measuring phase it is durably switched off. PWM phase and measuring phase exchange with each other alternately, in this context. This has the substantial advantage that the clock-pulse rate of the PWM phase is able to be selected so high, that the electrical machine fluctuates only very slightly about the setpoint rotary speed. The clock-pulse rate of the PWM phase is preferably in the kHz range and the clock-pulse period is in the µs range. This high clock-pulse rate, however, brings along with it the problem that no rotary speed measurement can be carried out during the turnoff times of the PWM signal, because, as a rule, the duration is too short for a measurement. Therefore, at regular intervals, the previously mentioned measuring phase is interposed in which the electrical machine is switched off, and a rotary speed measurement is able to be carried out. In this context, the measuring phase is selected so that the tracking voltage is able to be scanned once or a plurality of times.

The duration of the measuring phase preferably amounts to several ms. By contrast, the duration of a clock-pulse period during the PWM phase is preferably in the µs range.

The duration of the entire PWM phase is altogether preferably substantially greater than the duration of a measuring phase. This ratio preferably amounts to at least 5:1, particularly, for instance, 10:1. The higher the ratio, the more is the electrical energy that is able to be transmitted to the direct current motor. The duration of the entire PWM phases preferably amounts to between 10 and 100 ms, particularly, for instance, 50 ms.

Since the rotary speed controller requires steadily new rotary speed actual values, during the PWM phase, but these are not able to be measured, it is provided that one calculate the rotary speed values in the PWM phase with the aid of a mathematical model. To do this, preferably a rotary speed change is determined from other magnitudes, and the instantaneous rotary speed is estimated from an initial value and the rotary speed change. The rotary speed change is preferably a function of the supply voltage ($U_{batt}$) and the load acting on the motor.

The rotary speed change is calculated preferably using the following equation:

$$\dot{\omega} = \frac{1}{J}\left(\frac{k}{R} \cdot U_k - (M_{frict} + M_{load}) - \frac{k^2}{R} \cdot \omega\right)$$

The voltage $U_k$ is $U_k$=PWM $U_{batt}$. The load torque $M_{load}$ is able to be ascertained, for example, from various other sensor variables. The friction moment $M_{frict}$ is known, just as is the motor constant k, the ohmic resistance R and the moment of inertia J.

The calculation of the instantaneous rotary speed is preferably carried out in a control unit which includes an appropriate algorithm. The rotary speed controller then calculates a new pulse duty factor from the estimated values, in each case.

DETAILED DESCRIPTION

Figure 1:
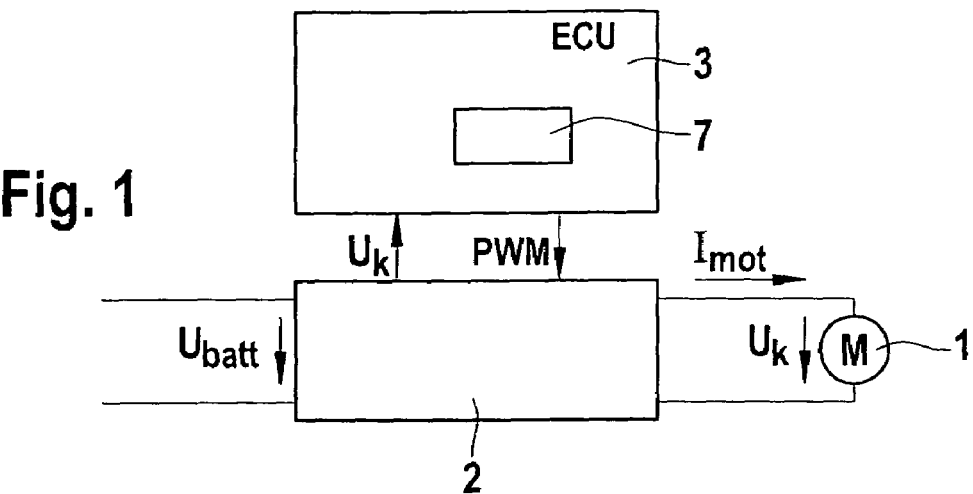
FIG. 1 shows a schematic representation of a direct current motor having rotary speed regulation.
Figure 3:
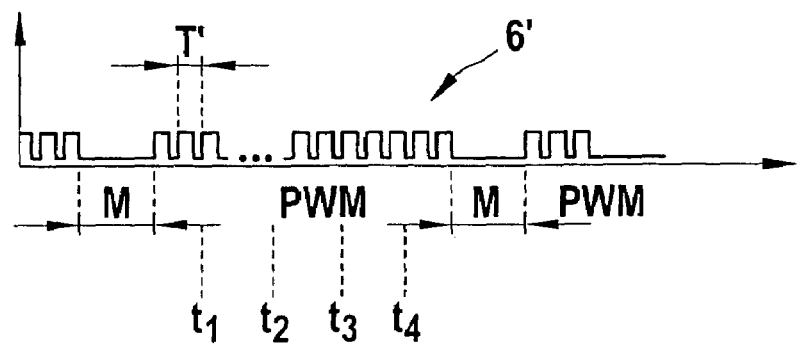
FIG. 3 shows a modified PWM signal according to one specific embodiment of the present invention.

FIG. 3 shows a modified PWM signal 6', by which direct current motor 1 and appertaining switching output stage 2 of FIG. 1 are controlled.

Modified PWM signal 6' includes a PWM phase PWM, in which direct current motor 1 is periodically switched on and off using a prespecified pulse duty factor, and a measuring phase M, in which direct current motor 1 is turned off or switched into regenerative operation. PWM phases PWM and measuring phases M exchange with each other alternately.

During measuring phase M, the rotary speed (or the electrical cyclic frequency) of direct current motor 1 is measured indirectly via regenerative terminal voltage $U_k$. An appropriate voltage sensor (in block 2) is provided for this. In the PWM phases PWM, rotary speed ω is calculated based on a model, and supplied to controller 7 as an input variable. (In this context, the calculation of the instantaneous rotary speed can be carried out by electronics system 2 or control unit 3).

Figure 2:
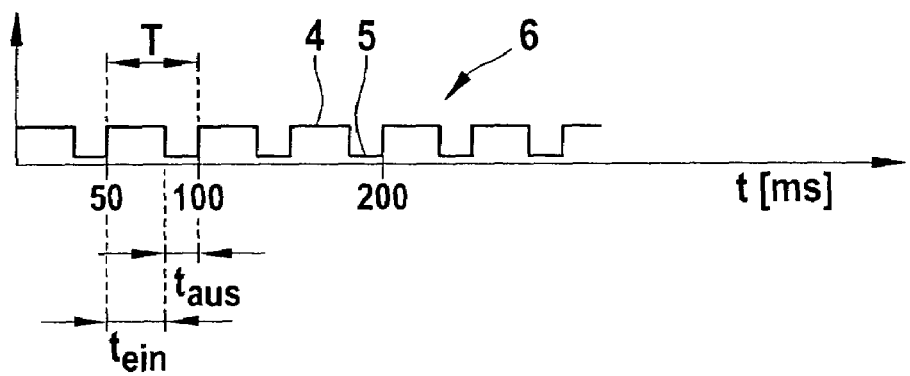
FIG. 2 shows a typical PWM signal according to the related art.

The clock-pulse rate during PWM phase PWM may amount, for instance, to between 20 kHz and 100 kHz, and is thus about 1000 times greater than in the case of signals in FIG. 2. The entire duration of PWM phase PWM, for example, amounts to between 10 ms and 50 ms. By contrast, measuring phase M lasts only a few ms, such as 2 or 3 ms. The overall duration of PWM phase PWM is about 10 times longer, in this instance, than the duration of measuring phase M. Consequently, a sufficient quantity of electrical energy is able to be transported to direct current motor 1.

The calculation of the rotary speed is carried out periodically (e.g. every 5 ms) at points in time t1-t4. Control algorithm 7 then determines a new pulse duty factor for the PWM signal in each case from the estimated values.

The instantaneous rotary speed ω is estimated, in this case, from an initial value $ω_0$ and the rotary speed change. For rotary speed change ω, the following equation applies:

$$\dot{ω} = \frac{1}{J}\left(\frac{k}{R} \cdot U_k - (M_{reib} + M_{last}) - \frac{k^2}{R} \cdot ω\right)$$

For finite time intervals Δt, the following difference equation comes about:

$$\frac{\Delta ω}{\Delta t} = \frac{ω_i - ω_{i-1}}{\Delta t}$$

The estimated instantaneous rotary speed $ω_i$ is yielded thereby recursively:

$$ω_i = ω_{i-1} + \Delta ω,$$

where $$\Delta ω = \frac{1}{J}\left(\frac{k}{R} \cdot U_k - (M_{frict} + M_{load}) - \frac{k^2}{R} \cdot ω_{i-1}\right)\Delta t$$

In this equation, $ω_{i-1}$ is an initial value and Δω is the change of the rotary speed during a subsequent control cycle $[t_{i-1}, t_i]$.

Figure 4:
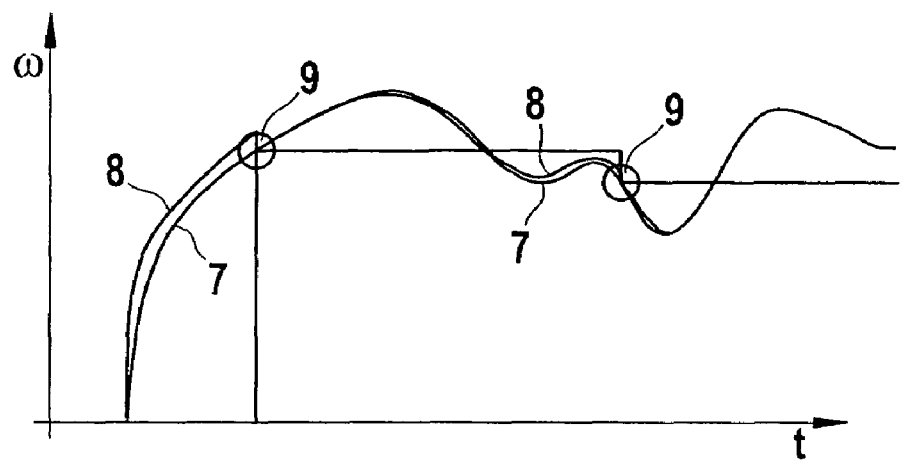
FIG. 4 shows the curve of an estimated and a measured rotary speed plotted against time.

FIG. 4 shows measured rotary speed 7 and estimated rotary speed 8 plotted against time. As may be seen, the estimate coincides very well with actual rotary speed 7. At measuring points 9, estimated rotary speed 8 is replaced by measured rotary speed 7, and in subsequent PWM phase PWM the calculation of the rotary speed is initialized again. That means, that in the next PWM phase, the calculation begins starting from the last measured rotary speed ω.

Figure 5:
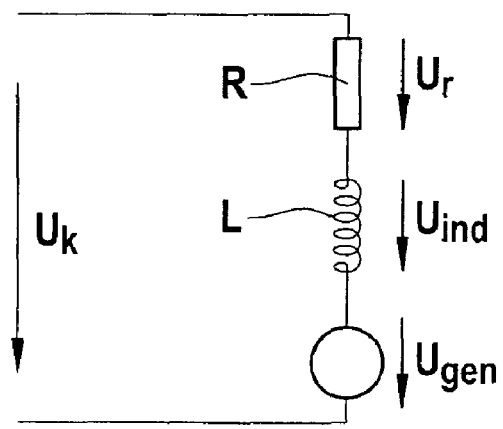
FIG. 5 shows a simple substitute circuit diagram of an electric motor.

The above-mentioned equation for the rotary speed change ω can be derived in a simple way while taking into account the substitute circuit diagram of FIG. 5. In FIG. 5, $U_r$ denotes the voltage dropping off at armature resistor R, where $U_r$=IR. $U_{ind}$ denotes the voltage induced at armature inductance L, where $U_{ind}$=L di/dt. $U_{gen}$ is the regenerative voltage that is a function of the motor constant k and the cyclic frequency of the motor ω. In this context, the following equation applies: $U_{gen}$=kω.

For terminal voltage $U_k$ of the electrical machine, the following applies:

$$U_k = RI + L\frac{di}{dt} + k \cdot ω \qquad (1)$$

The mechanical torque balance is:

$$J \cdot \frac{dω}{dt} = k \cdot I - M_{frict} - M_{load} \qquad (2)$$

In this connection, $M_{frict}$ is the moment of friction, $M_{load}$ is the load moment, J is the moment of inertia. Broadening the equation by using k/R yields:

$$\frac{k}{R} \cdot U_k = k \cdot I + M_{load} + L \cdot \frac{k}{R} \cdot \frac{di}{dt} + \frac{k^2}{R} \cdot ω \qquad (3)$$

Equations (2) and (3) yield: z $$J \cdot \dot{ω} + \frac{k^2}{R} \cdot ω = \frac{k}{R} \cdot U_k - (M_{frict} + M_{load}) \qquad (4)$$

Rearranging equation (4) yields:

$$\dot{\omega} = \frac{1}{J}\left(\frac{k}{R} \cdot U_k - (M_{frict} + M_{load}) - \frac{k^2}{R} \cdot \omega\right) \quad 5$$

What is claimed is:

1. A method for determining a rotary speed of an electrical machine, which is controlled in PWM operation, the method comprising:

ascertaining the rotary speed from a tracking voltage, which is measured in a turnoff phase;

estimating the rotary speed in the PWM phase with the aid of a mathematical model, wherein the rotary speed is ascertained in the PWM phase with the aid of a recursive function $\omega_i = \omega_{i-1} + \Delta\omega$, where $\Delta\omega = f(U_k, \omega_{i-1})$;

and controlling the electrical machine using a control signal, which has a PWM phase in which the electrical machine is periodically switched on and off using a prespecified pulse duty factor, and which has a measuring phase in which the electrical machine is switched off and the tracking voltage is measured.

2. The method according to claim 1, wherein the electrical machine is a direct current motor.

3. The method according to claim 1, wherein a duration of the measuring phase is greater than a clock-pulse period of the control signal in the PWM phase.

4. The method according to claim 1, wherein a duration of the measuring phase is in the ms range.

5. The method according to claim 1, wherein a duration of a clock-pulse period of the control signal in the PWM phase is in the μs range.

6. The method according to claim 1, wherein the duration of the measuring phase amounts to between 1 ms and 5 ms.

7. The method according to claim 1, wherein a duration of the PWM phase amounts to between 10 ms and 100 ms.

8. The method according to claim 1, wherein a duration of the PWM phase is substantially greater than a duration of the measuring phase.

9. A device for determining a rotary speed of an electrical machine, which is controlled in PWM operation, comprising:

a voltage sensor for measuring a tracking voltage;

an electronic system for determining the rotary speed from the measured tracking voltage;

an arrangement for estimating the rotary speed in the PWM phase with the aid of a mathematical model, wherein the rotary speed is ascertained in the PWM phase with the aid of a recursive function $\omega_i = \omega_{i-1} + \Delta\omega$, where $\Delta\omega = f(U_k, \omega_{i-1})$;

and an arrangement for controlling the electrical machine using a control signal, which has a PWM phase in which the electrical machine is periodically switched on and off using a prespecified pulse duty factor, and which has a measuring phase in which the electrical machine is switched into a regenerative operation and the tracking voltage is measured.

10. The device according to claim 9, wherein the electrical machine is a direct current motor.

11. A device for determining a rotary speed of an electrical machine, which is controlled in PWM operation, comprising:

an electronic system for determining the rotary speed from a measured tracking voltage, which is measured in a turnoff phase;

an arrangement for estimating the rotary speed in the PWM phase with the aid of a mathematical model, wherein the rotary speed is ascertained in the PWM phase with the aid of a recursive function $\omega_i = \omega_{i-1} + \Delta\omega$, where $\Delta\omega = f(U_k, \omega_{i-1})$;

and an arrangement for controlling the electrical machine using a control signal, which has a PWM phase in which the electrical machine is periodically switched on and off using a prespecified pulse duty factor, and which has a measuring phase in which the electrical machine is switched off and the tracking voltage is measured.

12. The device according to claim 11, wherein the electrical machine is a direct current motor.

13. The device according to claim 11, further comprising a voltage sensor for measuring a tracking voltage.

14. The device according to claim 11, wherein a duration of the measuring phase is greater than a clock-pulse period of the control signal in the PWM phase.

15. The method according to claim 11, wherein a duration of the measuring phase is in the ms range.

16. The method according to claim 11, wherein a duration of a clock-pulse period of the control signal in the PWM phase is in the μs range.

17. The method according to claim 11, wherein the duration of the measuring phase amounts to between 1 ms and 5 ms.

18. The method according to claim 11, wherein a duration of the PWM phase amounts to between 10 ms and 100 ms.

19. The method according to claim 11, wherein a duration of the PWM phase is substantially greater than a duration of the measuring phase.

* * * * *